Nov. 12, 1963 R. P. DUMM 3,110,470
MOUNTING MEANS FOR A GATE PACK-OFF
Filed Jan. 3, 1961 2 Sheets-Sheet 1
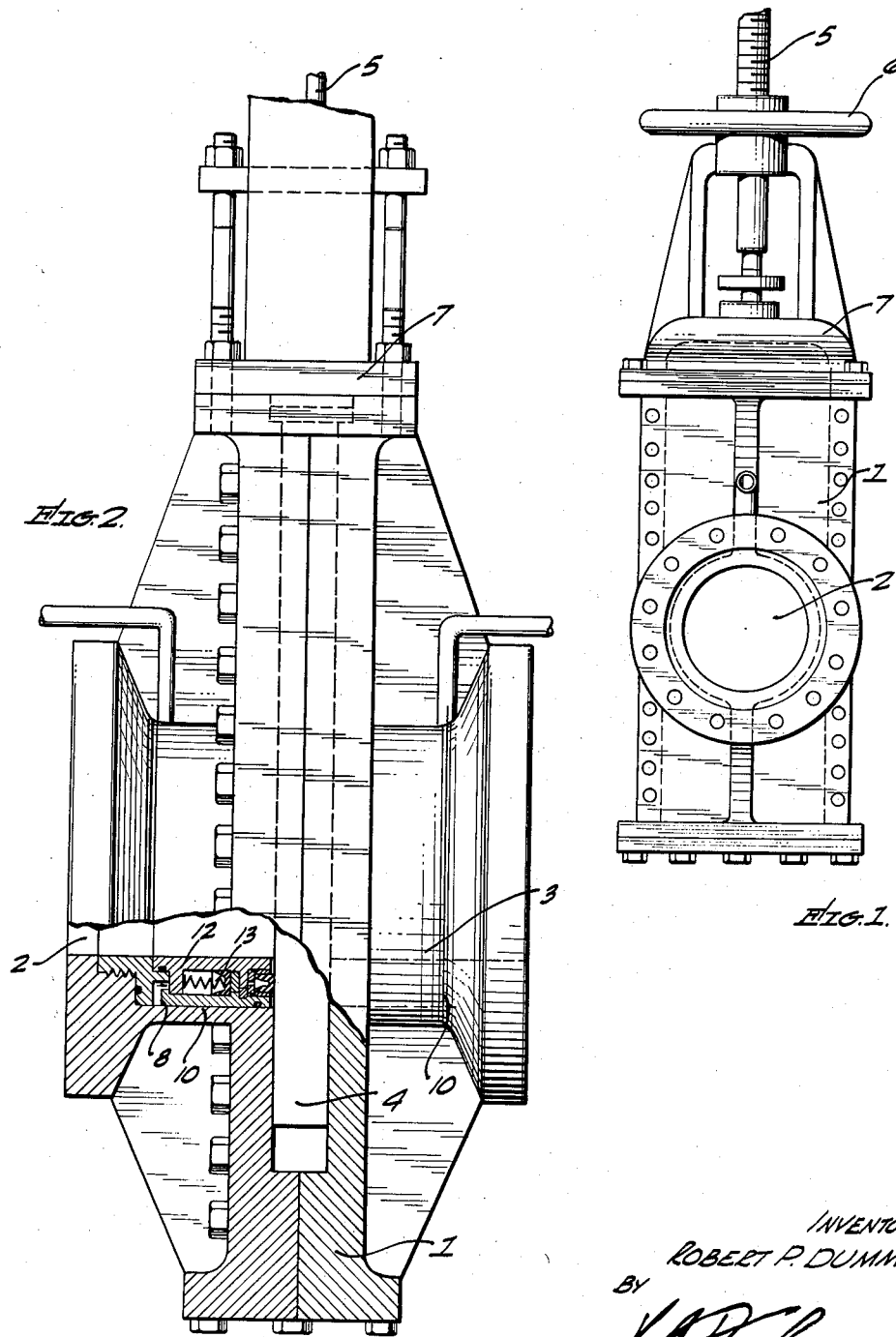
INVENTOR.
ROBERT P. DUMM,
BY
ATTORNEY.

Nov. 12, 1963  R. P. DUMM  3,110,470
MOUNTING MEANS FOR A GATE PACK-OFF
Filed Jan. 3, 1961  2 Sheets-Sheet 2
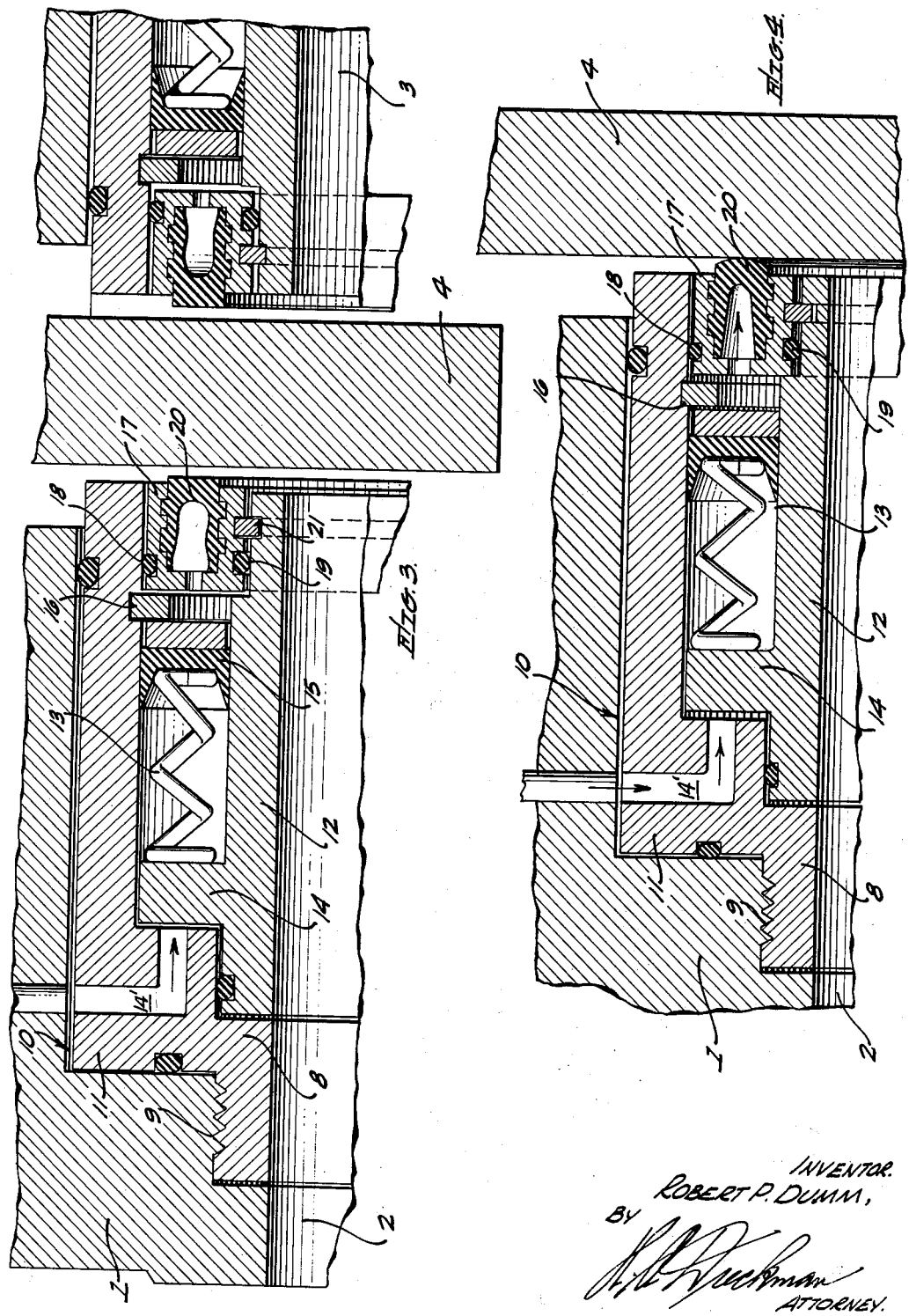
INVENTOR.
ROBERT P. DUMM,
BY
ATTORNEY.

United States Patent Office 3,110,470
Patented Nov. 12, 1963

3,110,470
MOUNTING MEANS FOR A GATE PACK-OFF
Robert P. Dumm, Long Beach, Calif., assignor to Pacific Valves, Inc., Long Beach, Calif., a corporation of California
Filed Jan. 3, 1961, Ser. No. 80,322
7 Claims. (Cl. 251—159)

This invention relates to a mounting means for a pack-off or sealing member of a valve, and particularly of a gate or slide valve where that gate or slide might or might not be tapered.

An object of my invention is to provide a novel mounting means for a pack-off member where the pack-off member itself may be removed from its carrier for purposes of repair or replacement.

A feature of my invention resides in a means of holding the pack-off in its carrier with a snap ring where the snap ring can be easily retracted when it is necessary to remove the pack-off structure.

Another object of my invention is to provide a novel mounting means for the pack-off member of a gate or slide valve, where the pack-off means can be removed and replaced from the inner or bonnet portion of the valve; thus eliminating the necessity of removing the entire valve body from the pipeline when repairs are necessary.

Other objects, advantages and features of invention may appear from the accompanying drawings, the subjoined detailed description and the appended claims.

In the drawing:

FIGURE 1 is a side elevation of a gate or slide type of valve.

FIGURE 2 is an end view of the same with parts broken away to show interior construction.

FIGURE 3 is an enlarged vertical sectional view through the valve showing the pack-off in retracted position.

FIGURE 4 is a view similar to FIGURE 3 showing the parts in another or sealing position of the pack-off.

Referring more particularly to the drawing, the numeral 1 indicates the body of a slide valve which includes an intake port 2 and an outlet port 3. These ports are aligned to permit fluid to flow through the valve in one position of the gate or slide. A gate or slide 4 is mounted for vertical movement within the body 1 of the valve and this gate is attached to a threaded stem 5 which is engaged by the hand wheel 6 to cause the stem and the gate to move vertically within the body 1 to open or close the valve. The gate or slide 4 may or may not be tapered from top to bottom thereof, as might be found most desirable. In certain instances the gate is tapered, and to effectively seat the pack-off structure against a tapered surface will be subsequently described. Other structural features of the valve, such as the bonnet 7, and other structural details of the body 1 are usual and well known in this art, and these particular well known details form no part of my invention. When the gate 4 is in closed position, as shown in FIGURES 3 and 4, it is necessary to pack-off this gate to prevent leakage into the body 1 of the valve, or past the gate 4, especially when the valve is in a high pressure line. This pack-off is accomplished in the following manner. A fixed ring 8 is mounted within the intake 2 or the outlet 3 or both, and this ring is preferably threaded, as shown at 9, into the body 1 of the valve, or by any other similar and suitable manner. The ring 8 is positioned within a cavity 10 in the body 1 of the valve and is formed with a shoulder 11 which butts against one face of this cavity 10. Thus the ring 8 is fixedly mounted within the cavity 10 of the valve and serves as a guide and mounting means for the remaining portion of the valve seat.

To seal the gate or slide 4 around the intake 2 and the outlet 3 of the valve body, I provide a carrier ring 12 which fits in the ring 8. The carrier 12 has a limited movement within the fixed ring 8 and is pressed away from the gate 4 by means of the coil spring 13, which spring bears against a shoulder 14 on the carrier ring at one end, and against a packing 15 at the other end. The packing 15 engages the snap or split ring 16 in the fixed ring 8, as shown in FIGURES 3 and 4. Thus the spring 13 will normally press the carrier 12 away from the gate 4. The carrier 12 and the packing seal 20 are moved towards the gate 4 to press the packing 20 against the gate by pressure fluid exerted in the duct 14' and against the shoulder 14.

To effectively seal off against the flat faces of the gate or slide 4, I provide the following packing structure on the carrier ring 12. This packing structure consists of a hollow metal annulus 17 which is fitted into the space between the inner ends of the carrier ring 12 and the fixed ring 8, and also lying inwardly of the split ring 16. This annulus 17 is sealed off against the fixed ring 8 by the O-ring seal 18, and against the carrier ring 12 by the O-ring 19. The annulus 17 has a rather loose fit within the fixed ring 8, and on the outside of the carrier ring 12, so that the annulus can tilt slightly if it is necessary when seating against a flat face of the gate 4. An elastomer seal 20 is fixedly mounted within the annulus 17, and the outer face of the seal 20 is pressed against the flat face of the gate 4 to pack-off at this point, as shown in FIGURE 4. The annulus 17 is held within the carrier ring 12 by the snap or split ring 21 which seats in the carrier and can be compressed to permit removal of the annulus 17, as well as its seal 20. When necessary to replace or repair the pack-off assembly for the gate 4, namely, the annulus 17, the seal 20, and the O-rings 18 and 19, it is only necessary to compress the snap ring 21, and the pack-off assembly can then be removed from the bonnet end of the valve and without requiring removal of the valve body from the pipe line. The somewhat loose mounting of the annulus 17 within the rings 8 and 12 permit proper alignment of the seal 20 against the face of the gate 4 to effectively seal this gate against leakage.

Having described my invention, I claim:

1. In a gate type valve including a body, a gate slidably mounted in said body, said body having an intake and an outlet port therein, both of said ports extending to said gate, said body having a cavity therein positioned adjacent the intake or outlet ports, a carrier mounted for limited movement in said cavity relative to the gate, spring means bearing against the carrier to urge said carrier in a direction away from the gate, an annulus, means removably securing the annulus to said carrier and a seal mounted in said annulus, said seal being engageable with one face of the gate, said body having a fluid pressure duct therein extending to said carrier to urge said carrier towards said gate.

2. In a gate type valve including a body, a gate slidably mounted in said body, said body having an intake and an outlet port therein, both of said ports extending to said gate, said body having a cavity therein positioned adjacent the intake or outlet ports, a carrier mounted for limited movement in said cavity relative to the gate, spring means bearing against the carrier to urge said carrier in a direction away from the gate, an annulus, means removably securing the annulus to said carrier and a seal mounted in said annulus, said seal being engageable with one face of the gate, said means securing the annulus on the carrier including a snap ring in said carrier, said snap ring fitting in the annulus, said body having a fluid pressure duct therein extending to said carrier to urge said carrier towards said gate.

3. In a gate type valve including a body, a gate slidably mounted in said body, said body having an intake and an outlet port therein, both of said ports extending to said gate, said body having a cavity therein positioned adjacent the intake or outlet ports, a fixed ring mounted in the body and positioned within said cavity, a carrier mounted for limited movement within said fixed ring, spring means bearing against the carrier and urging said carrier in a direction away from the gate, an annulus, said annulus being positioned between the inner ends of the fixed ring and the carrier, and means releasably mounting said annulus on the carrier and a seal mounted in the annulus, said seal being engageable with one face of the gate, said body having a fluid pressure duct therein extending to said carrier to urge said carrier towards said gate.

4. In a gate type valve including a body, a gate slidably mounted in said body, said body having an intake and an outlet port therein, both of said ports extending to said gate, said body having a cavity therein positioned adjacent the intake or outlet ports, a fixed ring mounted in the body and positioned within said cavity, a carrier mounted for limited movement within said fixed ring, spring means bearing against the carrier and urging said carrier in a direction away from the gate, an annulus, said annulus being positioned between the inner ends of the fixed ring and the carrier, and a snap ring in the carrier, said snap ring fitting into the annulus to releasably hold the annulus in position, and a seal mounted in the annulus, said seal being engageable with one face of the gate, said body having a fluid pressure duct therein extending to said carrier to urge said carrier towards said gate.

5. In a gate type valve including a body, a gate slidably mounted in said body, said body having an intake and an outlet port therein, both of said ports extending to said gate, said body having a cavity therein positioned adjacent the intake or outlet ports, a fixed ring mounted in the body and positioned within said cavity, a carrier mounted for limited movement within said fixed ring, spring means bearing against the carrier and urging said carrier in a direction away from the gate, an annulus, said annulus being positioned between the inner ends of the fixed ring and the carrier, and means releasably mounting said annulus on the carrier and a seal mounted in the annulus, said seal being engageable with one face of the gate, said annulus being loosely fitted between the fixed ring and the carrier, and packing means positioned between the annulus and the fixed ring and between the annulus and the carrier, said body having a fluid pressure duct therein extending to said carrier to urge said carrier towards said gate.

6. In a gate type valve including a body, a gate slidably mounted in said body, said body having an intake and an outlet port therein; both of said ports extending to said gate, said body having a cavity therein positioned adjacent the intake or outlet ports, a carrier mounted for limited movement in said cavity relative to the gate, a seal mounted on the carrier and engageable with one face of the gate, a fluid pressure pipe extending through the body and into said cavity on one side of said carrier to conduct fluid under pressure against said carrier, a spring positioned within the cavity, one end of the spring bearing against said carrier, a packing within the cavity, said packing bearing against the carrier and one end of the spring engaging the packing, and means engageable by the packing to prevent longitudinal movement of the packing in one direction within the cavity.

7. In a gate type valve including a body, a gate slidably mounted in said body, said body having an intake and an outlet port therein; both of said ports extending to said gate, said body having a cavity therein positioned adjacent the intake or outlet ports, a carrier mounted for limited movement in said cavity relative to the gate, a seal mounted on the carrier and engageable with one face of the gate, a ring fixedly mounted in said body and within the cavity, said ring being arranged between the intake or outlet port and the carrier, a shoulder on the carrier projecting towards said ring, a packing positioned between the carrier and the ring, a coil spring extending between the shoulder and the packing, means fixedly holding the packing against longitudinal movement in one direction relative to said ring, a fluid pressure pipe extending through the body and into said cavity on one side of said carrier to conduct fluid under pressure against said carrier to urge the seal against the gate.

References Cited in the file of this patent

UNITED STATES PATENTS

| 1,476,344 | McGee | Dec. 4, 1923 |
| 2,240,049 | Murphy | Apr. 29, 1941 |
| 2,370,751 | Prager | Mar. 6, 1945 |
| 2,810,542 | Bryant | Oct. 22, 1957 |
| 2,825,528 | Truitt | Mar. 14, 1958 |
| 2,886,283 | Natho | May 12, 1959 |

FOREIGN PATENTS

| 674,771 | Great Britain | July 2, 1952 |
| 1,213,643 | France | Nov. 2, 1959 |
| 877,389 | Germany | May 21, 1953 |